(12) United States Patent
Zhang (10) Patent No.: US 7,987,561 B2
(45) Date of Patent: Aug. 2, 2011

(54) EAR HOSE CLAMP HAVING AN INDICATION ARRANGEMENT

(75) Inventor: Hanzhen Zhang, Tianjin (CN)

(73) Assignee: Link-Tech (Tianjin) Metal Products Co., Ltd., Hanjiashu Industrial Park, Beichen District, Tianjin (CN)

( * ) Notice: Subject to any disclaimer, the term of this patent is extended or adjusted under 35 U.S.C. 154(b) by 797 days.

(21) Appl. No.: 12/001,811

(22) Filed: Dec. 13, 2007

(65) Prior Publication Data

US 2009/0151133 A1      Jun. 18, 2009

(51) Int. Cl.
  *F16L 33/02*    (2006.01)
  *B65D 63/02*    (2006.01)
(52) U.S. Cl. .................... 24/20 R; 24/20 CW; 24/20 EE
(58) Field of Classification Search ......................... None
  See application file for complete search history.

(56) References Cited

U.S. PATENT DOCUMENTS 4,492,004 A * 1/1985 Oetiker .......................... 24/20 R
5,687,457 A * 11/1997 Hama ....................... 24/20 CW

* cited by examiner

*Primary Examiner* — Jack W. Lavinder (57) ABSTRACT

A hose clamp for clamping a pipe comprises a metal belt having a first edge and a second edge adapted for being overlapped defining a receiving cavity therein for clamping a pipe with a predetermined diameter, a positioning arrangement comprising a positioning head extended from said first edge of said metal belt, and a positioning head holder provided on said second edge at a corresponding place for receiving said positioning head, so as to guide said first edge and said second edge together in position; and a fastening arrangement comprising at least a welding arrangement comprising a first welding element provided on said first edge and a second welding element provided on said second edge at a corresponding place for being welded with said first welding point, so as to fasten said first edge and said second edge together.

17 Claims, 8 Drawing Sheets

EAR HOSE CLAMP HAVING AN INDICATION ARRANGEMENT

BACKGROUND OF THE PRESENT INVENTION

1. Field of Invention

The present invention relates to a device that is used for connecting pipes, and more particularly to a hose clamp, which is strengthened for connecting not only soft pipe but also hard pipe, wherein the hose clamp includes an indication arrangement for determining the tightness of the hose clamp.

2. Description of Related Arts

Gas and liquid are transmitted by pipe, which are widely used in modern society, such as the chemistry pipe and compressed air pipe in industry; the water supply pipe and gas supply pipe in architecture. The pipes always need to be connected for extending the transmission, for connecting a pipe of different type, or for changing transmitting direction, and so on.

The connection of pipes usually includes three parts, pipe, pipe coupler, and hose clamp for fastening the pipe and the pipe coupler, wherein the hose clamp plays an important role for connecting pipe and the pipe coupler. The hose clamp not only should sealedly and securely clamp the pipes, but also should be used conveniently and safely. And the hose clamp should be able to be manufactured in scale economically. Oetiker Company of Swiss invents an ear type hose clamp in the fifties of the last century, and invents an ear type hose clamp having an elongate groove, which is 360 degree and can not be untied in the eighties of the last century.

These ear type hose clamps have been widely used in the industry field. However, conventionally these hose clamps are mainly used for pipes with certain flexibility, which is because the hose clamps at present has less intensity, so that they can not be used for connecting hard pipes. Further more, if clamp the pipe too hard, the hose clamp can not bear so large a force that it may be broken; if clamp the pipe too soft, the hose clamp can not clamp the pipes tightly, so that the pipes may leak water or gas outside, which may cause danger to the user.

SUMMARY OF THE PRESENT INVENTION

A main object of the present invention is to provide a hose clamp which has a clamping structure, so as to be used not only for connecting flexible pipes but also for connecting hard pipes.

Another object of the present invention is to provide a hose clamp having at least an indication arrangement for determining the tightness of the hose clamp, so that the hose clamp will not be broken or leak water or gas.

Another object of the present invention is to provide a hose clamp which is strengthened for not being easily broken.

Another object of the present invention is to provide a hose clamp having at least one welding point for securely and sealedly clamp around the pipes.

Accordingly, in order to accomplish the above object, the present invention provides a hose clamp for clamping a pipe comprises:

a metal belt having a first edge and a second edge adapted for being overlapped defining a receiving cavity therein for clamping a pipe with a predetermined diameter, a positioning arrangement comprising a positioning head extended from said first edge of said metal belt, and a positioning head holder provided on said second edge at a corresponding place for receiving said positioning head, so as to guide said first edge and said second edge together in position; and a fastening arrangement comprising at least a welding arrangement comprising a first welding element provided on said first edge and a second welding element provided on said second edge at a corresponding place for being welded with said first welding point, so as to fasten said first edge and said second edge together.

Therefore, the first edge and the second edge are welded so as to strength the connection of the metal belt, so that the hose clamp can be used for connecting hard pipes, such as PEX, PPR, PE, PB, ABS, Aluminum pipe, plastic pipe or other new type pipes. Further more, the hose clamp can sealedly and securely connect the pipes.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1 to FIG. 4 of the drawings, a hose clamp according to a preferred embodiment of the present invention is illustrated, in which a hose clamp for clamping a pipe comprises a metal belt 1, and a positioning arrangement 2 and a fastening arrangement 3 which are provided on the metal belt.

The metal belt 1 having a first edge 11 and a second edge 12 adapted for being overlapped defining a receiving cavity therein 13 for clamping a pipe onto a pipe coupler with a predetermined diameter. In this preferred embodiment, the second edge is the upper layer when the first edge and second edge are overlapping together.

The positioning arrangement 2 comprises a positioning head 21 extended from the first edge 11 of the metal belt 1, and a positioning head holder 22 provided on a second edge 12 at a corresponding place for receiving the positioning head 21, so as to guide the first edge 11 and the second edge 12 together in position.

The fastening arrangement 3 comprises at least a welding arrangement 31 comprising a first welding element 311 provided on the first edge 11 and a second welding element 312 provided on the second edge 12 at a corresponding place for being welded with the first welding point 311, so as to fasten the first edge 11 and the second edge 12 together. The distance between the first welding element 311 and the second welding element 312 is predetermined, which is adapted for clamping a pipe with a predetermined diameter.

The metal belt 1 for clamping the pipes can be embodied as a steel belt, such as stainless steel belt, because steel belt 1 has high intensity, so that it can bear a large force and is not easy to be broken. The belt 1 has two edges 12 and 13 at both ends of the belt respectively, wherein the two edges of the belt 1 are connected together forming a receiving cavity 13 so as to clamp the pipe-therewithin.

The positioning head 21 of the positioning arrangement 2 can be embodied as a tongue-shaped positioning head 21 extended from the first edge 11 of the metal belt 1, while the positioning head holder 22 can receive the tongue-shaped positioning head 2 therein for guiding the first edge 11 of the belt 1 and the second edge 12 of the belt 1 in position, so as to ensure that the two edges can be connected in a right place. The tongue-shaped positioning head 21 may be extended from a middle of a first end of the belt 1.

In addition, the positioning head holder 22 can be embodied as an elongate guiding groove 22 at an inner side of the second edge 12 at a corresponding place adapted for receiving the tongue-shaped positioning head 21 therein. The outer surface of the second edge may be protruded upwardly in a middle of the belt 1 in a longitudinal direction forming an elongate guiding groove 22 at inner side of the belt 1, so as to receiving the tongue-shaped positioning head 21 in position.

After the positioning arrangement 2 guides the two edges of the belt 1 in position, the two edges 11 and 12 should be securely fastened for clamping the pipes therein. In this preferred embodiment, the two edges are fastened together by welding the two welding element together at two edges respectively so as to secure the belt 1 clamp the pipes sealedly.

The belt 1 may have two or more welding arrangement 31 for further strengthens the connection of the two edges of the belt 1.

Further more, the fastening arrangement further comprises at least a engaging arrangement 32 provided on the belt 1 comprising a projection 321 protruded upwardly from the first edge 11 of the belt 1, and at least a hole 322 at a corresponding place at the second edge of the belt 1 for receiving the projection 321 therethrough, so as engage the first edge 11 to the second edge 12. The projection 321 may be embodied as tooth-shaped projection 321 for extending through hole 322 or a barb 321 for hooking the hole 322 so as securely retain the first edge 11 to the second edge 12. The fastening arrangement may comprise two or more engaging arrangement 32 that can enhance the security of the connection of the first edge 11 and the second edge 12 of the belt 1.

It is worth mentioning that the distance between the tooth-shaped projection 321 and it corresponding hole 322 for receiving the tooth 321 has predetermined distance so as to clamp a pipe with a predetermined diameter. The distance should be a little longer than the perimeter of the pipe for being clamped, so that the hose clamp can clamp onto the pipe.

Figure 1:
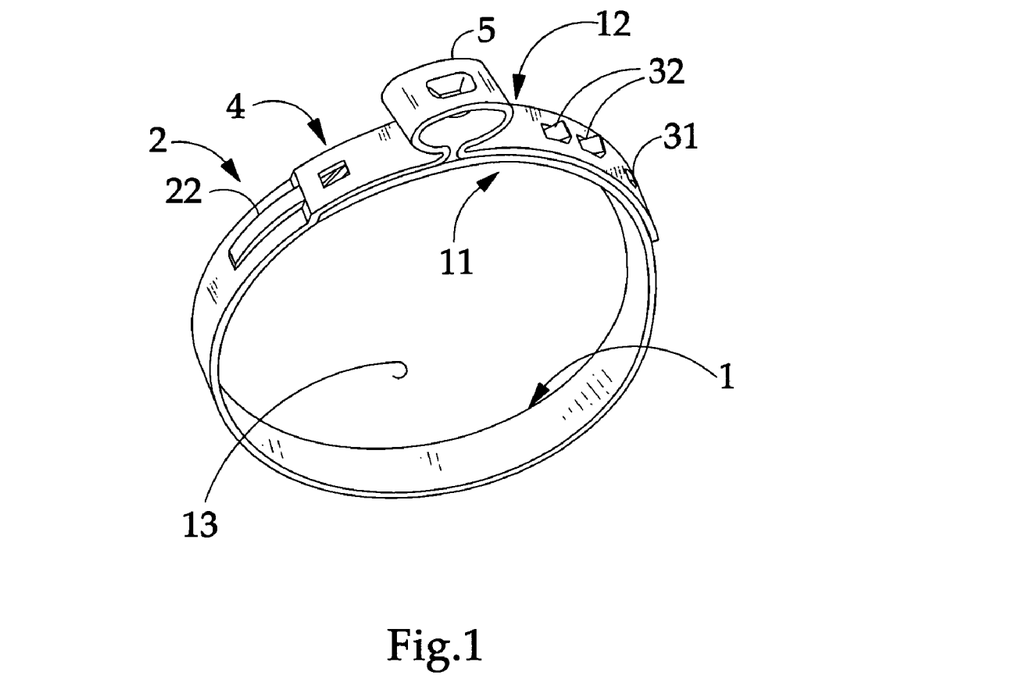
FIG. 1 is a perspective view of a hose clamp having an indication arrangement according to a preferred embodiment of the present invention.
Figure 2:
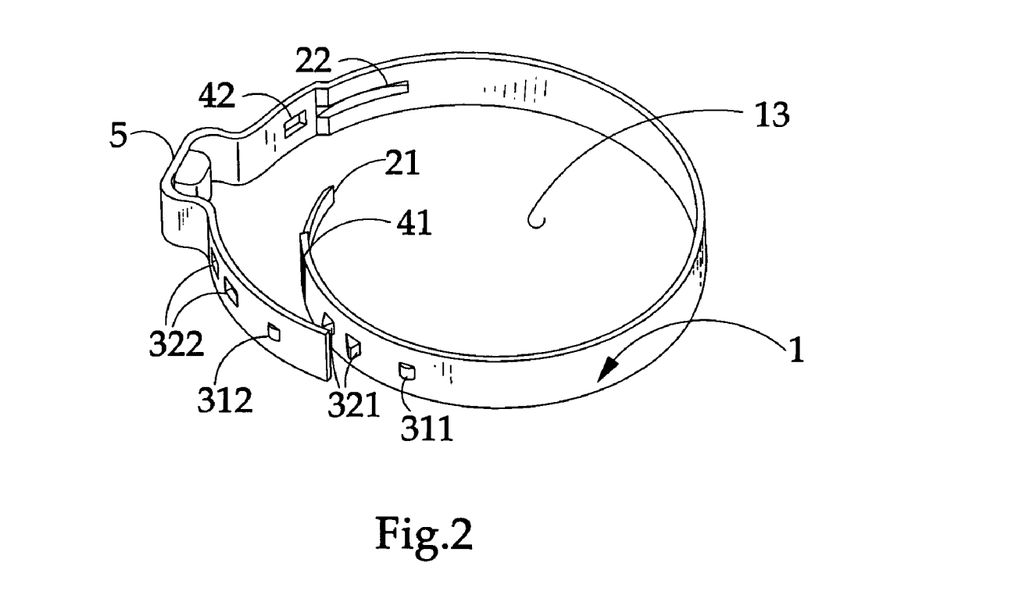
FIG. 2 is a perspective view of a hose clamp having an indication arrangement, wherein the first edge and the second edge of the belt are not connected, according to the above preferred embodiment of the present invention.
Figure 3:
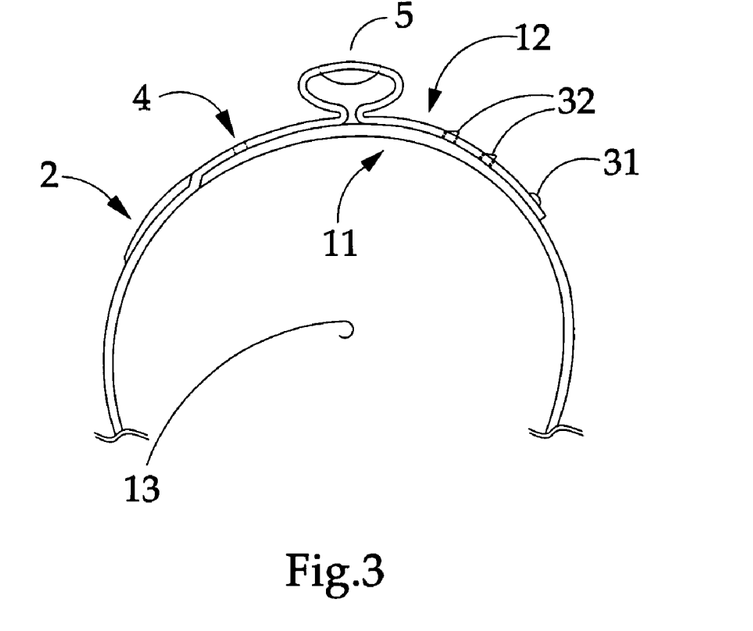
FIG. 3 is a sectional view of a hose clamp having an indication arrangement of FIG. 1 according to the above preferred embodiment of the present invention.
Figure 4:
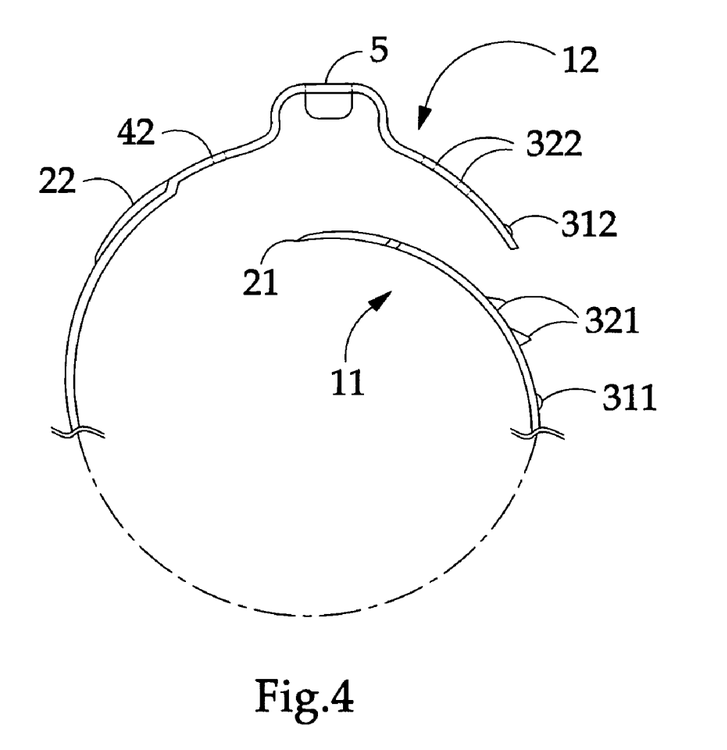
FIG. 4 is a sectional view of a hose clamp having an indication arrangement of FIG. 2 according to the above preferred embodiment of the present invention.
Figure 5A:
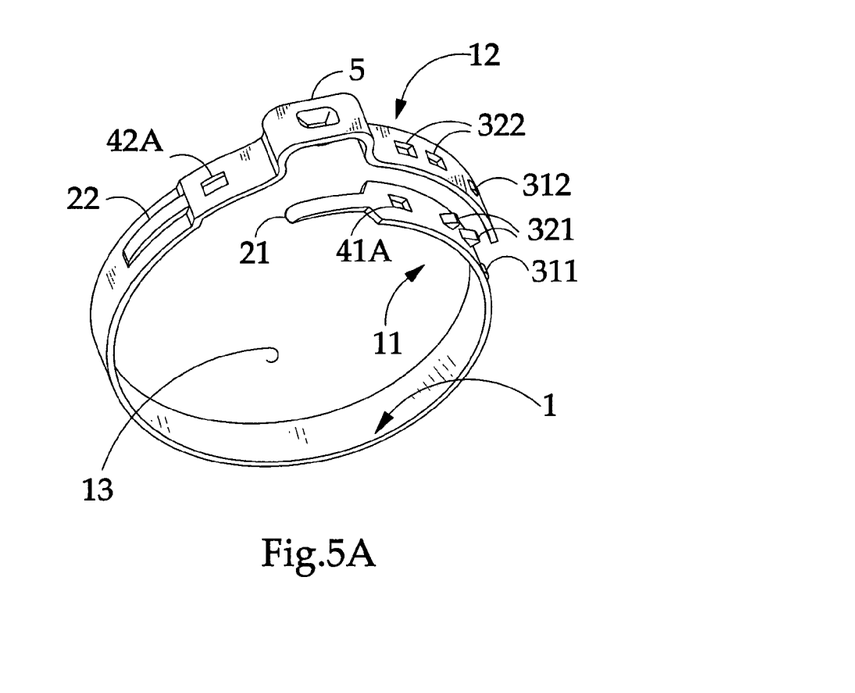
FIG. 5A is a perspective view of a hose clamp having two indication windows at the first and second edge of the belt respectively according to the above preferred embodiment of the present invention.
Figure 5B:
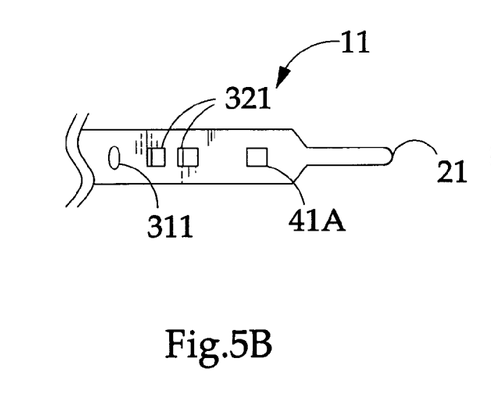
FIGS. 5B and 5C are the sectional views of first and second edge of the FIG. 5A respectively according to the above preferred embodiment of the present invention.
Figure 5C:
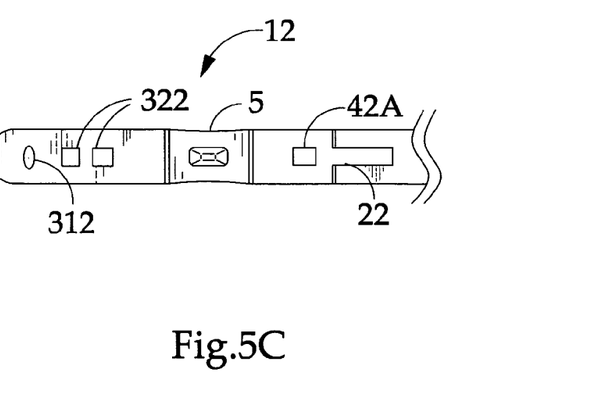

Referring to FIG. 5 of the drawings, the hose clamp of the present invention further comprises an indication arrangement 4 provided on the belt 1 comprising a first indicator 41 on the first edge 11 and a second indicator 42 on the second edge 12 adapted for overlapping so as to indicate whether the two edges of the belt are connected properly. However, it should be seen when the two indicator overlap with each other.

It is worth mentioning that the distance between the first indicator 41 and the second indicator 42 is predetermined so as to ensure that the hose clamp can clamp the pipe sealedly and tightly, and ensure that the hose clamp will not be tightened too hard and broken. The distance of the first indicator 41 and the second indicator 42 is a litter larger than the perimeter of the pipe, so that the hose clamp can clamp onto the pipe. In fact, the distance between the first indicator 41 and the indicator sign 42 is the perimeter of the hose clamp, so are the distance between the tooth 321 and the corresponding hole 322, and the distance between the first welding element 311 and the second welding element 312.

As shown in FIG. 5, the second indicator can be embodied as an second indication window 42A on the second edge 12 of the belt 1, and the first indicator 41 at a corresponding place on the first edge 11 of the belt 1, so that said first indicator can be seen through said second indication window, and then a user can judge whether the two edges of the belt 1 have been secured in position. If the user can see the first indicator 41 through the second indication window 42A in the right place, which shows that the two edges of the belt 1 are connected properly; if the user can not see the indicator 41 through the second indication window 42, or see that the indicator is not in the right place, which shows that the belt 1 needs to be further tightened or loosen to properly connect the two edges.

And the first indicator 41 can be embodied as a first indication window 41A that can be seen through from the second indication window 42A. The two indication widows have same size, so that the user can make sure that the belt are fastened properly by seeing the entire first indication window 41A. Further more, the two indication windows can be embodied as holes.

Figure 6A:
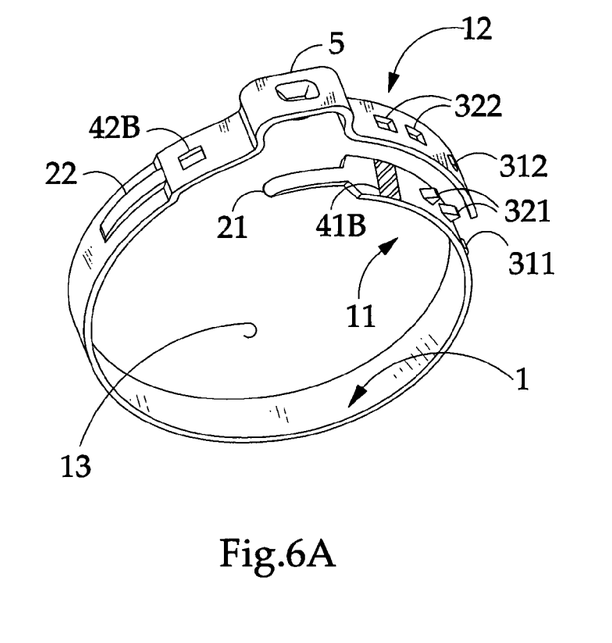
FIG. 6A perspective view of a hose clamp having an indication widow at the first edge and a color stripe at the second edge of the belt respectively according to the above preferred embodiment of the present invention.
Figure 6B:
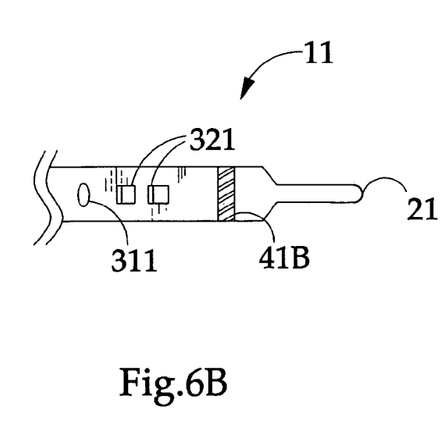
FIGS. 6B and 6C are sectional views of first and second edge of the FIG. 6A respectively according to the above preferred embodiment of the present invention.
Figure 6C:
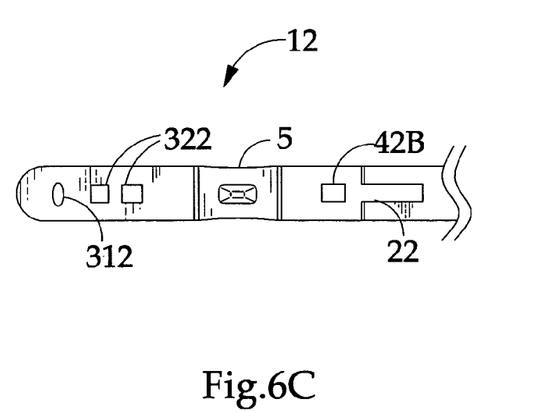

Referring to FIG. 6 of the drawings, the first indicator 41 can also be embodies as a color strip 41B that can be seen through the indication window 42B. The color strip 41B may have at least a color thereon or two or more colors, so that the user can judge whether the belt 1 is tied loosely or tightly.

Figure 7A:
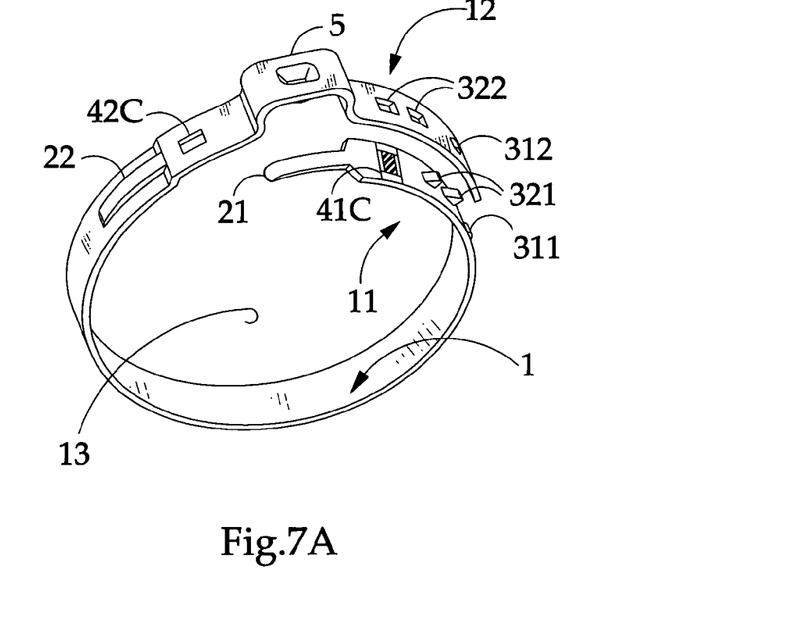
FIG. 7A perspective view of a hose clamp having an indication widow at the first edge and a stamped strip at the second edge of the belt respectively according to the above preferred embodiment of the present invention.
Figure 7B:
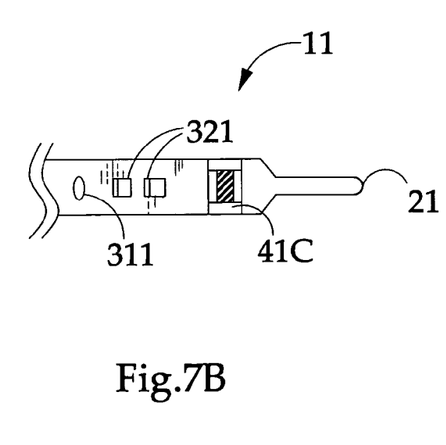
FIGS. 7B and 7C are sectional views of first and second edge of the FIG. 6A respectively according to the above preferred embodiment of the present invention.
Figure 7C:
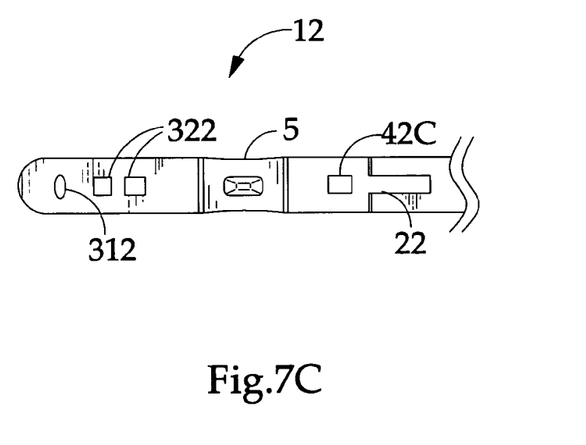

Referring to FIG. 7 of the drawings, the first indicator 41 can also be embodies as a stamped strip 41C that can be seen through the indication window 42C. The stamped strip 41C may have a color thereon, so that the user can judge whether the belt 1 is tied loosely or tightly.

Figure 8A:
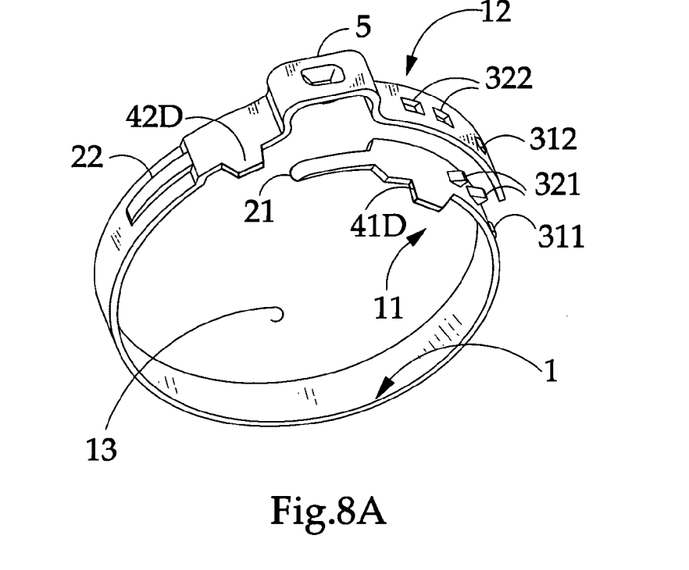
FIG. 8A perspective view of a hose clamp having a first fin at the first edge and a second fin at the second edge of the belt respectively according to the above preferred embodiment of the present invention.
Figure 8B:
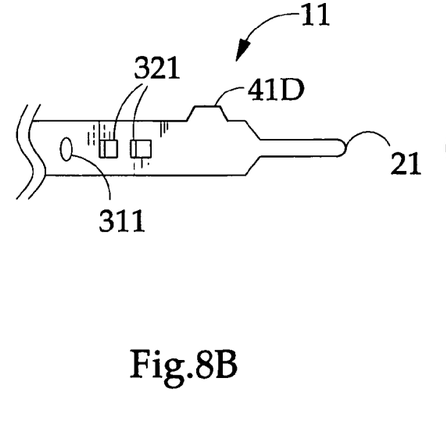
FIGS. 8B and 8C are sectional views of first and second edge of the FIG. 7A respectively according to the above preferred embodiment of the present invention.
Figure 8C:
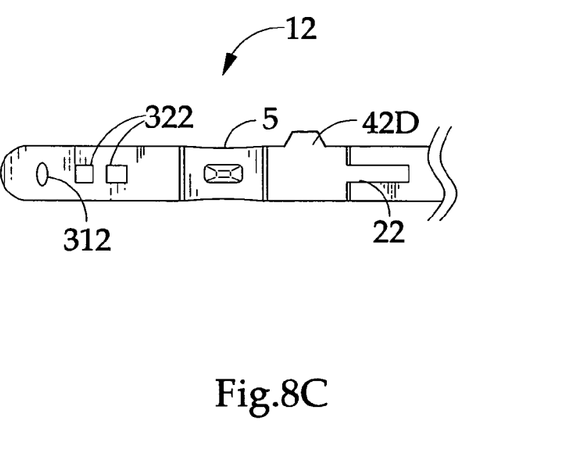

Referring to FIG. 8 of the drawings, the first indicator 41 is embodied as a first fin 41D extending outwardly from one side of the first edge 11, and the second indicator 42 is embodied as a second fin 41D extending outwardly from same side of the second edge 12, wherein the first fin 41D and the second fin 41D are adapted for overlapping when two edges of the belt are connected, so as to ensure the two edges are fastened in a right place.

The first fin 41D and the second fin 42D can be of any shape, triangle, rectangular, trapezium or semicircle. However the first fin 41D had better have a same shape and same size with the second fin 42D for being completely overlapped together, so as to precisely locate the two edges together.

Figure 9A:
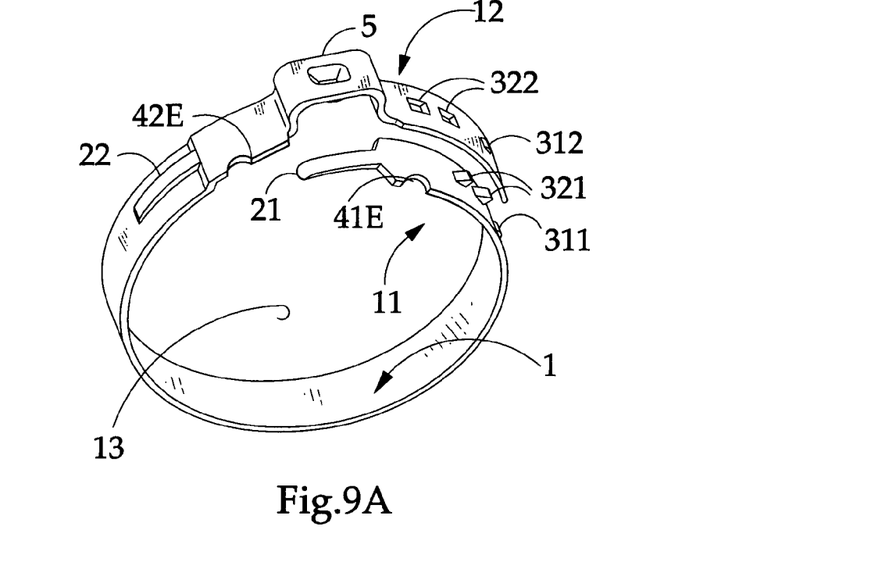
FIG. 9A perspective view of a hose clamp having a first indentation at the first edge and a second indentation at the second edge of the belt respectively according to the above preferred embodiment of the present invention.
Figure 9B:
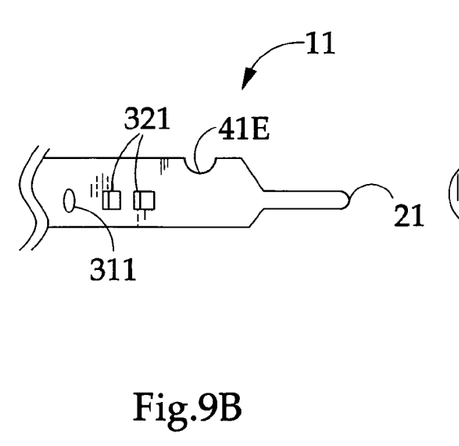
FIGS. 9B and 9C are sectional views of first and second edge of the FIG. 8A respectively according to the above preferred embodiment of the present invention.
Figure 9C:
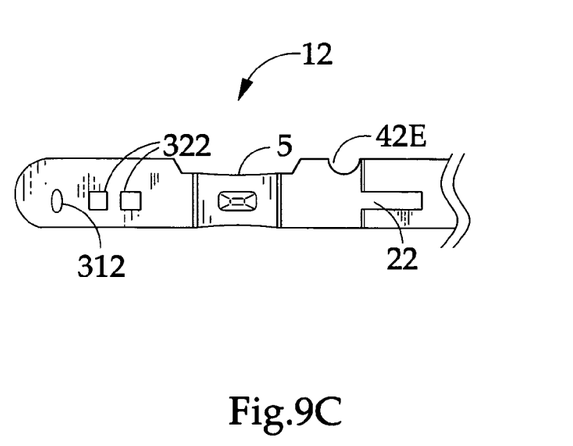

Alternatively, referring to FIG. 9 of the drawings, the first indicator 41 can be also embodied as an first indentation 41E indented inwardly from one side of the first edge 11, and the second indicator 42 can be also embodies as a second indentation 42E extending inwardly from same side of the second edge 12, wherein the first indentation 41E and the second indentation 42E are adapted for overlapping when two edges of the belt are connected, so as to ensure the two edges are fastened in a right place.

The first indentation 41E and the second indentation 42E can be of any shape, triangle, rectangular, trapezium or semicircle. However the first indentation 41E had better have a same shape and same size with the second indentation 42E for being completely overlapped together, so as to precisely locate the two edges together.

It is worth mentioning that the indentation can be formed by widen the metal belt, which means the belt is widened other than the place to be indicated. In this alternative, a first half-circle shaped indentation is left at the first edge, and a second half-circle shaped indentation is left at a corresponding place at the second edge.

The hose clamp further comprises a tightness adjustment device 5 that can adjust the tightness of the belt 1. A part of the belt 1 are lifted upwardly forming a tightness adjustment device 5. By clamping the tightness adjustment device 5, the length of the belt is reduced, so that the hose clamp is tightened. By pushing the tightness adjustment device 5 downwardly, the length of the belt is enlarged, so that the hose clamp is loosed.

The tightness adjustment device 5 can be embodied as an ear having a dimple thereon for providing a retaining load and a spring action in the clamp. The expansion and contraction during thermocycling or vibrating conditions will not affect the tightness of the clamp. The ear of the clamp should be deformed with a constant tool jaw force and recommended closing force.

Figure 10:
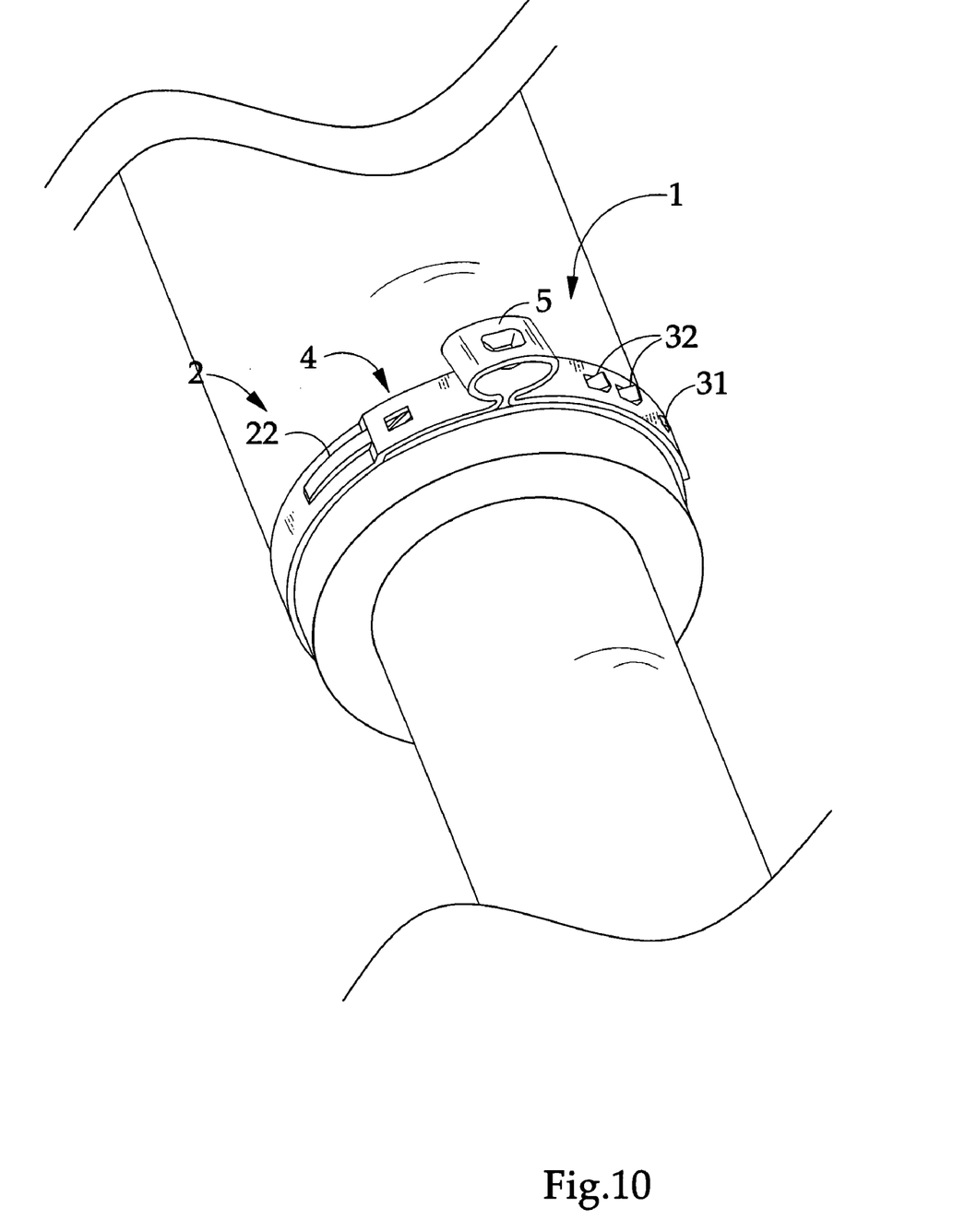
FIG. 10 illustrates a practical application of a hose clamp of the present invention according to the above preferred embodiment of the present invention.

Referring to FIG. 10 of the drawing, by all these components, the hose clamp can clamp the pipes securely and sealedly. By positioning two edges of the belt, adjusting tightness of the belt by judging it via the indication arrangement, and fastening two edges of the belt by fastening arrangement, the hose clamp can be conveniently used.

Therefore, the first edge and the second edge are welded so as to strength the connection of the metal belt, so that the hose clamp can be used for connecting hard pipes, such as PEX, PPR, PE, PB, ABS, Aluminum pipe, plastic pipe or other new type pipes. Further more, the hose clamp can sealedly and securely connect the pipes.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A hose clamp for clamping a pipe onto a pipe coupler comprising:
    a metal belt having a first edge and a second edge adapted for being overlapped defining a receiving cavity therein for clamping a pipe with a predetermined diameter;
    a positioning arrangement comprising a positioning head extended from said first edge of said metal belt, and a positioning head holder provided on said second edge at a corresponding place for receiving said positioning head, so as to guide said first edge and said second edge together in position;
    a fastening arrangement comprising at least a welding arrangement comprising a first welding element provided on said first edge and a second welding element provided on said second edge at a corresponding place for being welded with said first welding element, so as to fasten said first edge and said second edge together; and
    an indication arrangement provided on said belt comprising a first indicator provided on said first edge and a second indicator on said second edge adapted for overlapping onto said first indicator, so as to indicate whether the two edges of the belt are connected in a right place.

2. The hose clamp, as recited in claim 1, wherein said second indicator can be embodied as a second indication window, so that said first indicator can be seen through said indication window.

3. The hose clamp, as recited in claim 2, wherein said first indicator can be embodied as a first indication window.

4. The hose clamp, as recited in claim 2, wherein said first indicator can be embodied as a color strip.

5. The hose clamp, as recited in claim 2, wherein said first indicator can be embodied as a stamped strip.

6. The hose clamp, as recited in claim 1, wherein said first indicator is embodies as a first fin extending outwardly from one side of said first edge, and said indicator is embodied as a second fin extending outwardly from same side of said second edge, wherein said first fin and the second fin are adapted for overlapping when two edges of said belt are connected, so as to ensure said two edges are fastened in a right place.

7. The hose clamp, as recited in claim 6, wherein said first fin and second fin have same size and shape.

8. The hose clamp, as recited in claim 1, wherein said first indicator is embodies as a first indentation indented inwardly from one side of said first edge, and said indicator is embodied as a second indentation indented inwardly from same side of said second edge, wherein said first indentation and the second indentation are adapted for overlapping when two edges of said belt are connected, so as to ensure said two edges are fastened in a right place.

9. A hose clamp for clamping a pipe onto a pipe coupler comprising:

a metal belt having a first edge and a second edge adapted for being overlapped defining a receiving cavity therein for clamping a pipe with a predetermined diameter;

a positioning arrangement comprising a positioning head extended from said first edge of said metal belt, and a positioning head holder provided on said second edge at a corresponding place for receiving said positioning head, so as to guide said first edge and said second edge together in position;

a fastening arrangement comprising at least a welding arrangement comprising a first welding element provided on said first edge and a second welding element provided on said second edge at a corresponding place for being welded with said first welding element, so as to fasten said first edge and said second edge together, and at least an engaging arrangement provided on said belt comprising a projection projected upwardly from said first edge of the belt, and at least a hole at a corresponding place at said second edge of said belt for receiving said projection therethrough, so as to engage said first edge with said second edge in position; and an indication arrangement provided on said belt comprising a first indicator provided on said first edge and a second indicator on said second edge adapted for overlapping onto said first indicator, so as to indicate whether the two edges of the belt are connected in a right place.

10. The hose clamp, as recited in claim 9, wherein said second indicator can be embodied as a second indication window, so that said first indicator can be seen through said indication window.

11. The hose clamp, as recited in claim 10, wherein said first indicator can be embodied as a first indication window.

12. The hose clamp, as recited in claim 10, wherein said first indicator can be embodied as a color strip.

13. The hose clamp, as recited in claim 10, wherein said first indicator can be embodied as a stamped strip.

14. The hose clamp, as recited in claim 9, wherein said first indicator is embodies as a first fin extending outwardly from one side of said first edge, and said indicator is embodied as a second fin extending outwardly from same side of said second edge, wherein said first fin and the second fin are adapted for overlapping when two edges of said belt are connected, so as to ensure said two edges are fastened in a right place.

15. The hose clamp, as recited in claim 14, wherein said first fin and second fin have same size and shape.

16. The hose clamp, as recited in claim 9, wherein said first indicator is embodies as a first indentation indented inwardly from one side of said first edge, and said indicator is embodied as a second indentation indented inwardly from same side of said second edge, wherein said first indentation and the second indentation are adapted for overlapping when two edges of said belt are connected, so as to ensure said two edges are fastened in a right place.

17. The hose clamp, as recited in claim 16, wherein said first indentation and second indentation have same size and shape.

\* \* \* \* \*